United States Patent
Hassan et al.

(10) Patent No.: US 7,552,349 B2
(45) Date of Patent: Jun. 23, 2009

(54) USER CONFIGURABLE POWER CONSERVATION THROUGH LCD DISPLAY SCREEN REDUCTION

(75) Inventors: Amer A. Hassan, Kirkland, WA (US); Pradeep Bahl, Redmond, WA (US); Paramvir Bahl, Sammamish, WA (US); Thomas W. Kuehnel, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 464 days.

(21) Appl. No.: 11/073,901

(22) Filed: Mar. 7, 2005

(65) Prior Publication Data

US 2008/0141049 A1 Jun. 12, 2008

(51) Int. Cl.
G06F 1/26 (2006.01)
G06F 1/32 (2006.01)
G06F 11/30 (2006.01)

(52) U.S. Cl. .............. 713/320; 713/300; 713/323; 713/324; 713/330; 713/340; 345/210; 345/698

(58) Field of Classification Search ............. 713/320, 713/300, 323, 324, 330, 340; 345/210, 698
See application file for complete search history.

(56) References Cited

U.S. PATENT DOCUMENTS

| | | | |
|---|---|---|---|
| 5,598,565 A * | 1/1997 | Reinhardt ............. 713/323 |
| 5,691,745 A | 11/1997 | Mital | |
| 5,784,628 A | 7/1998 | Reneris | |
| 5,901,361 A * | 5/1999 | Luong ............. 455/517 |
| 6,243,821 B1 | 6/2001 | Reneris | |
| 6,597,339 B1 * | 7/2003 | Ogawa ............. 345/102 |
| 6,618,045 B1 | 9/2003 | Lin | |
| 6,795,137 B1 | 9/2004 | Whitted et al. | |
| 6,900,798 B2 * | 5/2005 | Heie ............. 345/211 |
| 7,036,025 B2 * | 4/2006 | Hunter ............. 713/300 |
| 7,062,250 B1 * | 6/2006 | Kosaka ............. 455/343.5 |
| 7,114,086 B2 * | 9/2006 | Mizuyabu et al. ............. 713/320 |
| 7,295,183 B2 * | 11/2007 | Willemin et al. ............. 345/156 |
| 2005/0052446 A1 * | 3/2005 | Plut ............. 345/211 |

* cited by examiner

*Primary Examiner*—Thomas Lee
*Assistant Examiner*—Michael J Brown
(74) *Attorney, Agent, or Firm*—Wolf, Greenfield & Sacks, P.C.

(57) ABSTRACT

A novel system and method increase battery life for portable computing devices through intelligent display management. A user interface allows a user to input threshold values and parameters such that power management actions are taken should battery power fall below the thresholds. Such actions include the reduction of size to the projected display, disabling of network activity, and management of intensive CPU processes.

13 Claims, 7 Drawing Sheets

USER CONFIGURABLE POWER CONSERVATION THROUGH LCD DISPLAY SCREEN REDUCTION

FIELD OF THE INVENTION

This invention relates generally to power management, and more particularly, to a system and method for controlling portable computing device displays to reduce power consumption.

BACKGROUND OF THE INVENTION

Portable computing is increasingly important in many environments including home and business contexts. Important portable computing capabilities include worldwide roaming, location based services, RTC on the go and the like. Improvements in computer and network architecture and functionality have continually improved the user experience. For instance, handoff, security, and session continuity are important for roaming. VLAN support can be used for guest access. Currently, however, certain areas of computing technology fall short and prevent users from having full and rich experiences in portable computing scenarios. For example, despite improvements in battery technology, users are still frustrated by the inability to use the laptop for an extended period of time without having to charge the battery. The lack of duration for portable devices is a prevalent and continuing problem and leads to user frustration, loss of productivity, and lack of technology adoption by users.

Thus, despite the improved power source technologies, concomitant improvements in power consumption are also needed to improve power duration and user satisfaction. The display or monitor of a computing device is often the most-used output device and is also often the greatest power consumer. Most desktop displays use a cathode ray tube (CRT), while portable computing devices such as laptops incorporate liquid crystal display (LCD), light-emitting diode (LED), gas plasma or other image projection technology. Because of their slimmer design and lesser energy consumption, monitors using LCD technologies are the most common in laptops and are beginning to replace the venerable CRT on many desktops. The LCD display can be a very power hungry component of a portable computing device, consuming as much as one third of the overall power being consumed. In fact, LCD displays consume on average between 30 and 40 watts.

Many LCD displays are "active-matrix" and depend on thin film transistors (TFTs). Typically, TFTs are arranged on a glass substrate in a matrix configuration, so that activating an individual pixel corresponds to switching on a particular row while sending a signal down a particular column. A capacitor corresponding to the pixel is thus charged and holds the charge until the display is refreshed. A polarizing crystal for the pixel is activated by the capacitor's charge and allows light to pass through from behind. Varying degrees of pixel brightness can be achieved by varying the voltage to which the capacitor is charged; the polarizing crystal allows more or less light to pass depending on the voltage supplied. The power consumption of an LCD display is due primarily to the pixel writing technique described above as well as to backlighting that is used to light the display.

Thus, although innovations have been made to provide longer-lasting batteries and to lessen the power consumption of portable devices, existing technology still does not allow for adequate device duration nor does it allow adequate user management of power conservation features.

BRIEF SUMMARY OF THE INVENTION

The problems outlined are largely addressed by systems and methods for improved display power management and user configurable power management features, as described herein. The following presents a simplified summary of the disclosure in order to provide a basic understanding to the reader. This summary is not an exhaustive or limiting overview of the disclosure. The summary is not provided to identify key and, or critical elements of the invention, delineate the scope of the invention, or limit the scope of the invention in any way. Its sole purpose is to present some of the concepts disclosed in a simplified form, as an introduction to the more detailed description that is presented later.

Systems and methods are provided for increasing battery life for portable computing devices. A user interface is provided where a user can input threshold values and parameters such that power management actions are taken should battery power fall below the thresholds. Such actions include the reduction of size to the projected display, disabling of network activity, and management of intensive CPU processes. By reducing the effective size of the display, battery life can be increased significantly.

Reduction of display size is achieved by reducing power to individual pixels or portions of the display. Although the resulting display can be of a smaller actual size, it need not be of a smaller resolution. The parameters controlling the power threshold, display size and display resolution can be manually input by a user or can be automatically set by the operating system.

In one embodiment, a computer-readable medium is provided including computer-executable instructions for conserving power on a portable computing device, the portable computing device comprising a display unit and a power unit, the power unit providing power to the display unit, the display unit providing a display at a first resolution, the computer-executable instructions comprising instructions for monitoring an amount of power remaining in the power unit, determining that the remaining power falls below a first threshold, and in response to the amount of remaining power falling below the first threshold level, partitioning the display into a first and a second portion and causing power to be substantially reduced to the first portion.

In another embodiment, a user interface for managing power consumption is provided for use in a portable computing device comprising a display unit and a power unit, the power unit providing power to the display unit, the display unit providing a display at a first resolution, the user interface comprising a user-selectable option for setting a first power threshold, and a user-selectable option for specifying at least one action to be performed if the power remaining in the power unit falls below the first threshold, wherein the at least one action to be performed comprises substantially reducing the amount of power directed to a partitioned portion of the display, and causing the display unit to provide a display at a lower resolution.

In still another embodiment, a method is provided for conserving power on a portable computing device, the portable computing device comprising a display unit and a power unit, the power unit providing power to the display unit, the display unit providing a display at a first resolution, and the method comprising the steps of monitoring the amount of power remaining in the power unit, and in response to the amount of remaining power falling below a first threshold level, partitioning the entire display into a first and a second portion, and causing power to be substantially reduced to the first portion.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

Methods and systems to conserve device power and to allow a user to configure power management features according to embodiments of the invention will now be described with respect to preferred embodiments; however, the methods and systems of the present invention are not so limited. Moreover, the skilled artisan will readily appreciate that the methods and systems described herein are merely exemplary and that variations can be made without departing from the spirit and scope of the invention. After reviewing this description, it will be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method operations or system elements, it should be understood that those operations and those elements may be combined in other ways to accomplish the same objectives. Operations, elements, and features discussed only in connection with one embodiment are not intended to be excluded from a similar role in other embodiments. Moreover, use of ordinal terms such as "first" and "second" in the claims to modify a claim element does not by itself connote any priority, precedence, or order of one claim element over another or the temporal order in which operations of a method are performed, but are used merely as labels to distinguish one claim element having a certain name from another element having a same name (but for use of the ordinal term) to distinguish the claim elements.

The present invention will be more completely understood through the following detailed description, which should be read in conjunction with the attached drawings. In this description, like numbers refer to similar elements within various embodiments of the present invention. Aspects of the invention are illustrated as being implemented in a suitable computing environment. Although not required, the invention will be described in the general context of computer-executable instructions, such as procedures, being executed by a computing device. Although the invention has applicability to portable computing devices, it will be appreciated that the same techniques apply to any computing device having an LCD display.

Generally, procedures include program modules, routines, functions, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices. The term computer system may be used to refer to a system of computers such as may be found in a distributed computing environment.

Figure 1:
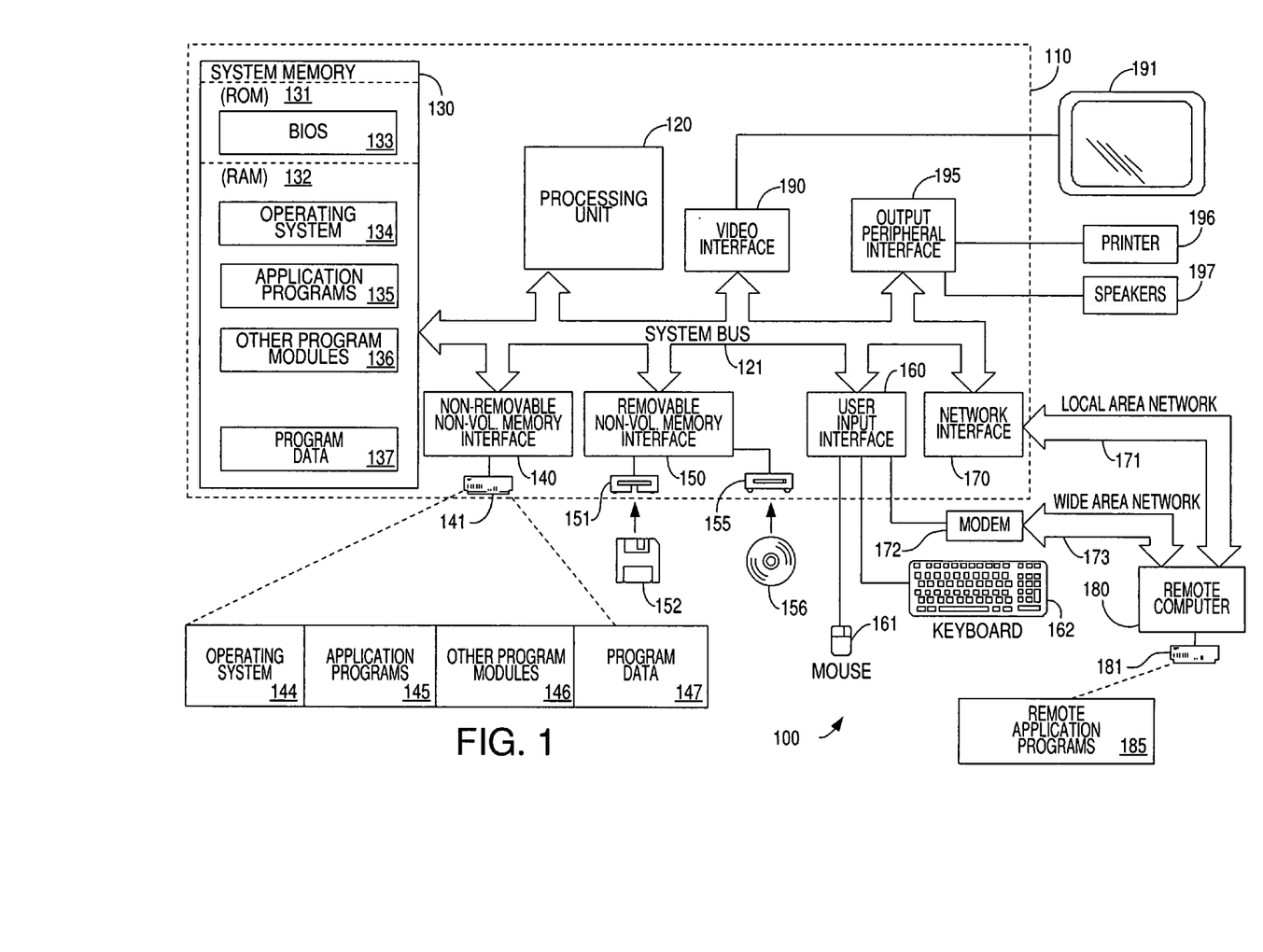
FIG. 1 is a simplified schematic illustrating an exemplary architecture of a computing device, usable to implement embodiments of the invention.

FIG. 1 illustrates an example of a suitable computing system environment 100 on which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100. Although one embodiment of the invention does include each component illustrated in the exemplary operating environment 100, another more typical embodiment of the invention excludes non-essential components, for example, input/output devices other than those required for network communications.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by the computer 110 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a tablet, or electronic digitizer, a microphone, a keyboard 162 and pointing device 161, commonly referred to as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. As will be described more fully within the specification, the monitor 191 can be a liquid crystal display (LCD) device comprising individually controllable pixels and backlights. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 195 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used. In particular, the computer 110 may also contain a wireless networking interface or wireless card, such as operating according to an IEEE 802.11 protocol.

Figure 2:
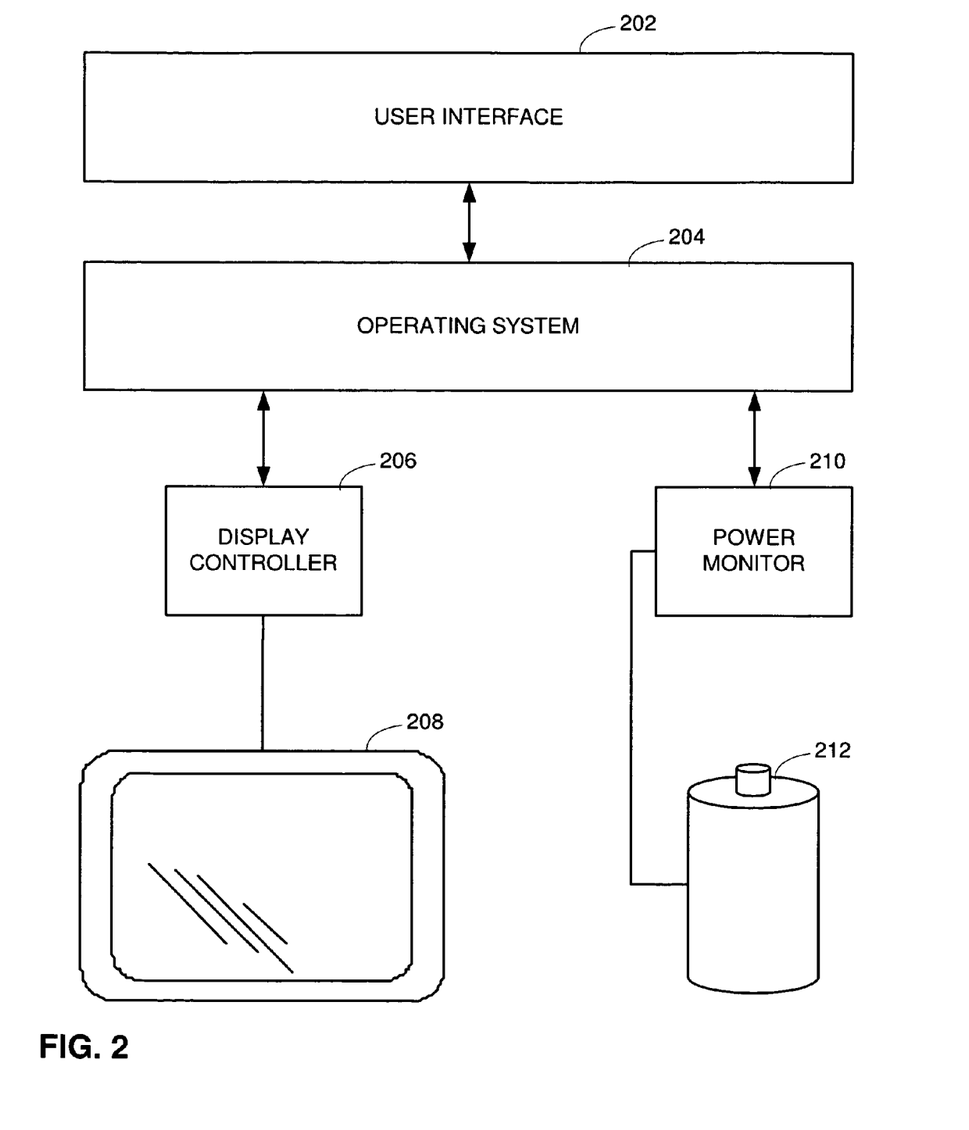
FIG. 2 is an architectural diagram illustrating components of a system for conserving battery power through user-configurable screen display reduction, in accordance with an embodiment of the invention.

In an embodiment of the invention, a system for configuring and managing power in a portable computing device consists of several components, as illustrated in FIG. 2. A graphical, text-based or other user interface 202 is presented to a user, through which the user can configure various settings for power management. The user interface 202 interacts with the operating system 204 of the computing device, such as, for example, an operating system in the MICROSOFT WINDOWS family of operating systems. The invention is not, however, limited to operation with a MICROSOFT WIN- DOWS operating system, and the operating system 204 could be any of a number of alternative systems. The operating system 204 interacts with a low-level display controller 206 for controlling the output on a display 208, such as a liquid crystal display. The operating system 204 further interacts with a power monitor module 210 for monitoring the status of a portable power unit 212 for the computing device. In some embodiments of the invention, the portable power unit 212 includes advanced monitoring capabilities to facilitate easy monitoring by the power monitoring 210. In other embodiments, the power monitor 210 monitors voltage levels and other indicia from the power unit 212 to determine its status.

Figure 3:
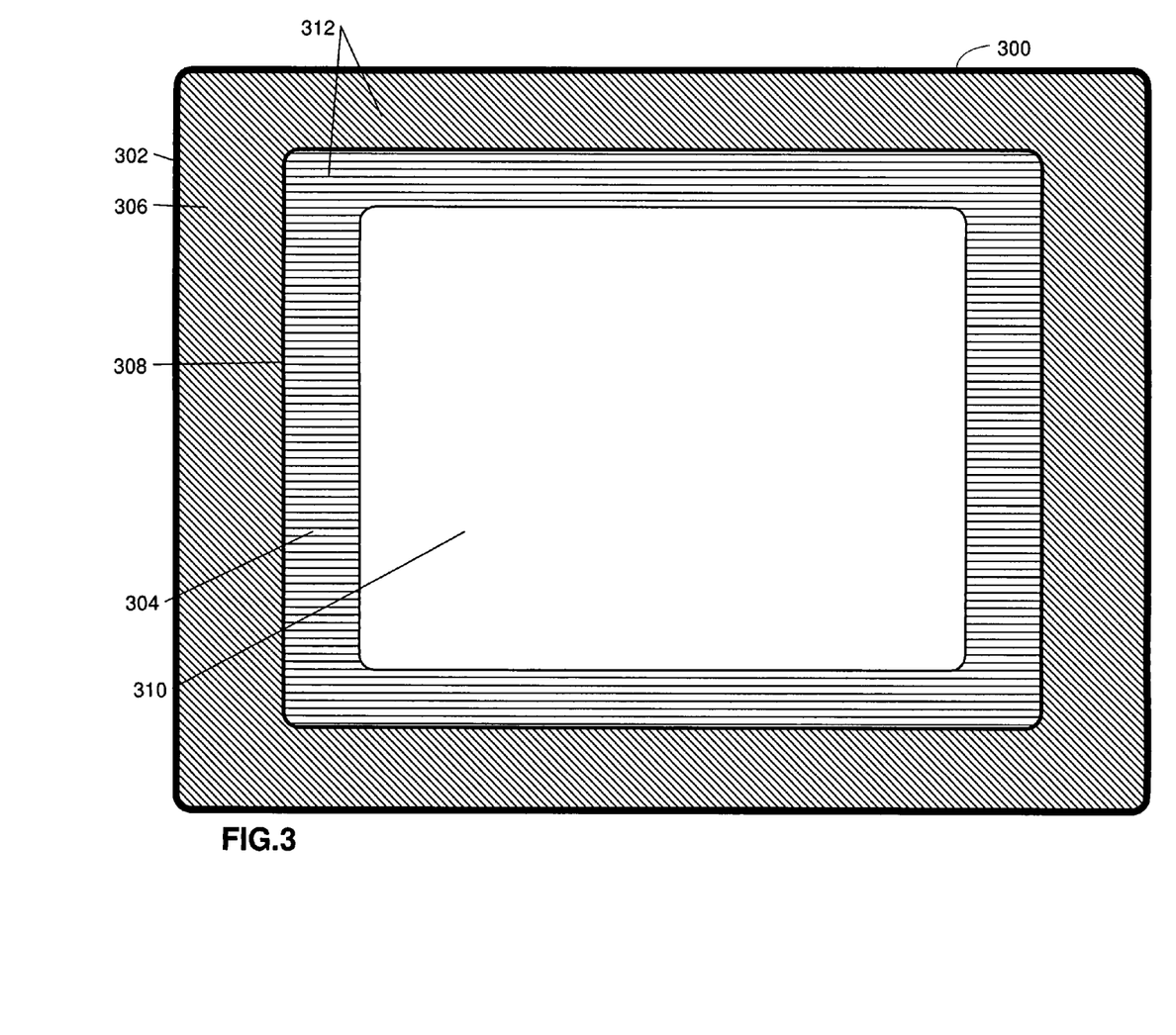
FIG. 3 is a simplified diagram illustrating the reduction of power to portions of exemplary display screen, in accordance with an embodiment of the invention.

Turning attention to FIG. 3, a sample display unit 300 is shown. In some embodiments of the invention, the display unit 300 is a liquid crystal display comprising rows and columns of individual pixels. Embodiments of the invention allow for control of individual pixels, or for individual rows or columns of pixels. The display unit 300 comprises a display 310 that is preferably a substantially rectangular shape, with a width of a fixed number of pixels and a height of a fixed number of pixels. A standard aspect ratio for the width and height of the display is 4:3, and standard sizes include 1280×960 pixels, 1024×768 pixels, 800×600 pixels and 640×480 pixels. Other standard ratios are 3:2 (e.g., 1280×854 pixels) and 16:10 (e.g., 1440×900 pixels). Alternative embodiments of the invention include displays at non-standard sizes and resolutions.

It will be appreciated that although a display unit 300 can project a display that is a given number of pixels wide and a given number of pixels high (i.e., the size of the display), the resolution of the projected display may actually be coarser. For example, if the display unit 300 projects a display that covers 1280×960 actual pixels in size, the projected display may have a resolution of only 640×480 apparent pixels—each apparent pixel is a coarser conglomeration of four actual pixels—giving the effect of magnifying the display.

The display unit 300 in the example of FIG. 3 projects a display 302 at a maximum size of 1024×768 pixels. In an embodiment of the invention, the display unit 300 is a component of a portable computing device, such as a notebook computer. When the power remaining in the battery of the computing device drops below some threshold value, the display unit 300 effectively reduces the size of the display in the following manner in an embodiment of the invention. The display is partitioned into a first portion 304 and a surrounding portion 306. Power is reduced or eliminated to pixels of the surrounding portion 306, resulting in the appearance of the display unit 300 projecting a display at a smaller size. In the example, the smaller size is a display 308 of 800×600 pixels. Preferably, the resolution of the projected display 308 is also reduced accordingly, so that the projected display 308 appears to the user as a scaled-down version of the original projected display 302.

In an embodiment of the invention, further monitoring of the battery allows for further reduction in the size and resolution of the projected display 308. For example, when the power remaining in the battery of the computing device drops below another threshold value (e.g., 10%, or some user-configured value), the display is again partitioned into a smaller portion 310 and a surrounding portion 312. The smaller portion 310 is preferably smaller than the previously displayed portion 304. Power is reduced or eliminated to the pixels of the surrounding portion 312, resulting in the appearance of the display unit 300 projecting a display at a smaller size. In the example, the smaller size is a display 310 of 640×480 pixels. Preferably, the resolution of the projected display 310 is also reduced accordingly, so that the projected display 310 appears to the user as a scaled-down version of the original projected display 302, and of the previously projected display 304.

Figure 4:
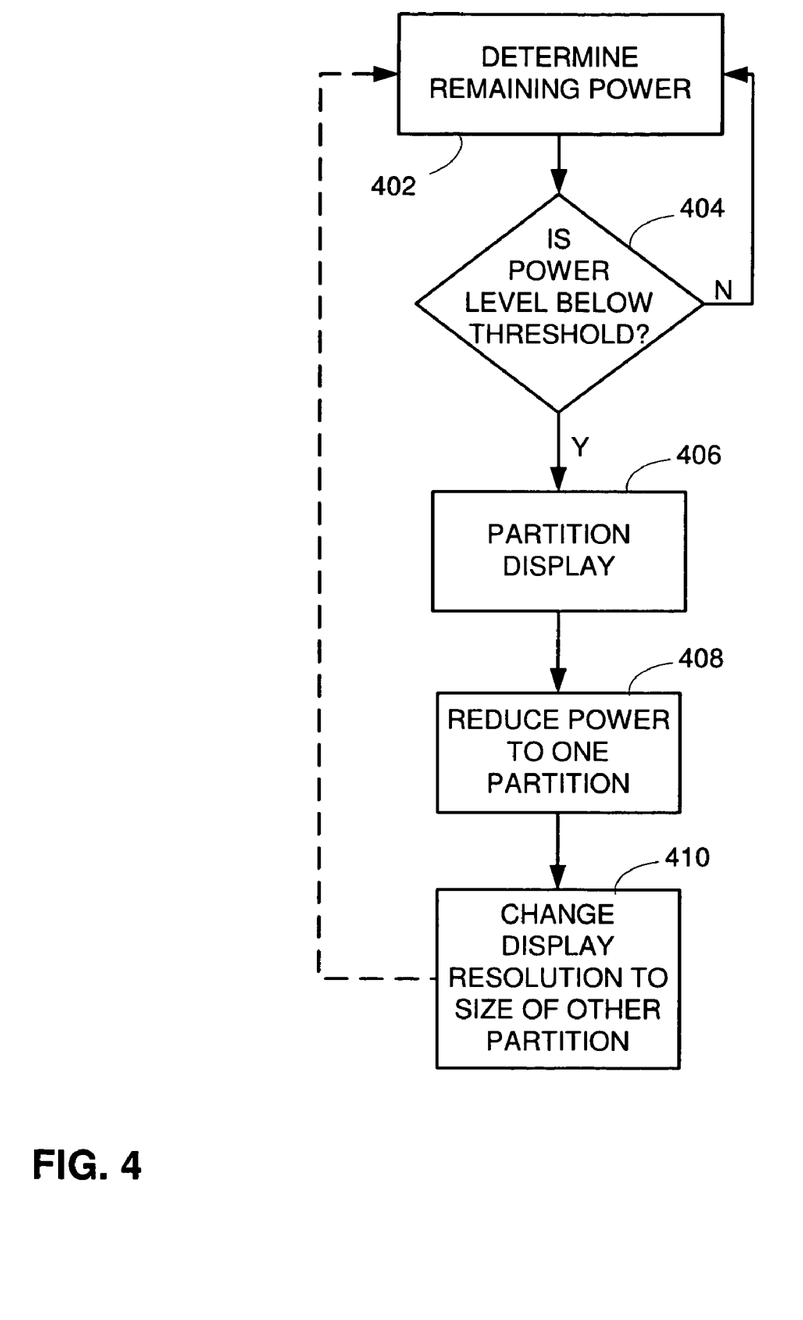
FIG. 4 is a flow diagram illustrating a process for conserving power in a computing device by effectively reducing the size and resolution of a display in accordance with an embodiment of the invention.

A method used in particular embodiments of the invention to conserve power by reducing a display is described with reference to FIG. 4. Remaining power in a computing device's battery or other power source is continuously monitored via steps 402 and 404. In particular, at step 402, the remaining power of the power source is determined, such as by receiving a voltage reading from the power source or by analyzing the source via a monitor such as monitor 210. Subsequently, at step 404, if the power level has dropped below a threshold value (such as a percentage of capacity, voltage, etc.), then the display is partitioned at step 406. Otherwise the process returns to step 402 for further monitoring.

The threshold value may be preset or may be user-configured in embodiments of the invention. One partition preferably is smaller than the currently displayed portion of the display unit. Power is reduced to the other partition at step 408 by turning off or reducing power to individual rows, columns and/or pixels of the display unit. At step 410, the resolution of the projected display is accordingly reduced so that the projected portion of the display appears to the user as a smaller version of the previously projected display. Alternatively, the turned off partition(s) may be contiguously. In one embodiment of the invention, the method returns for further monitoring at step 402, so that the display can be further reduced in size and resolution should the battery level drop below yet another threshold value.

Figure 5:
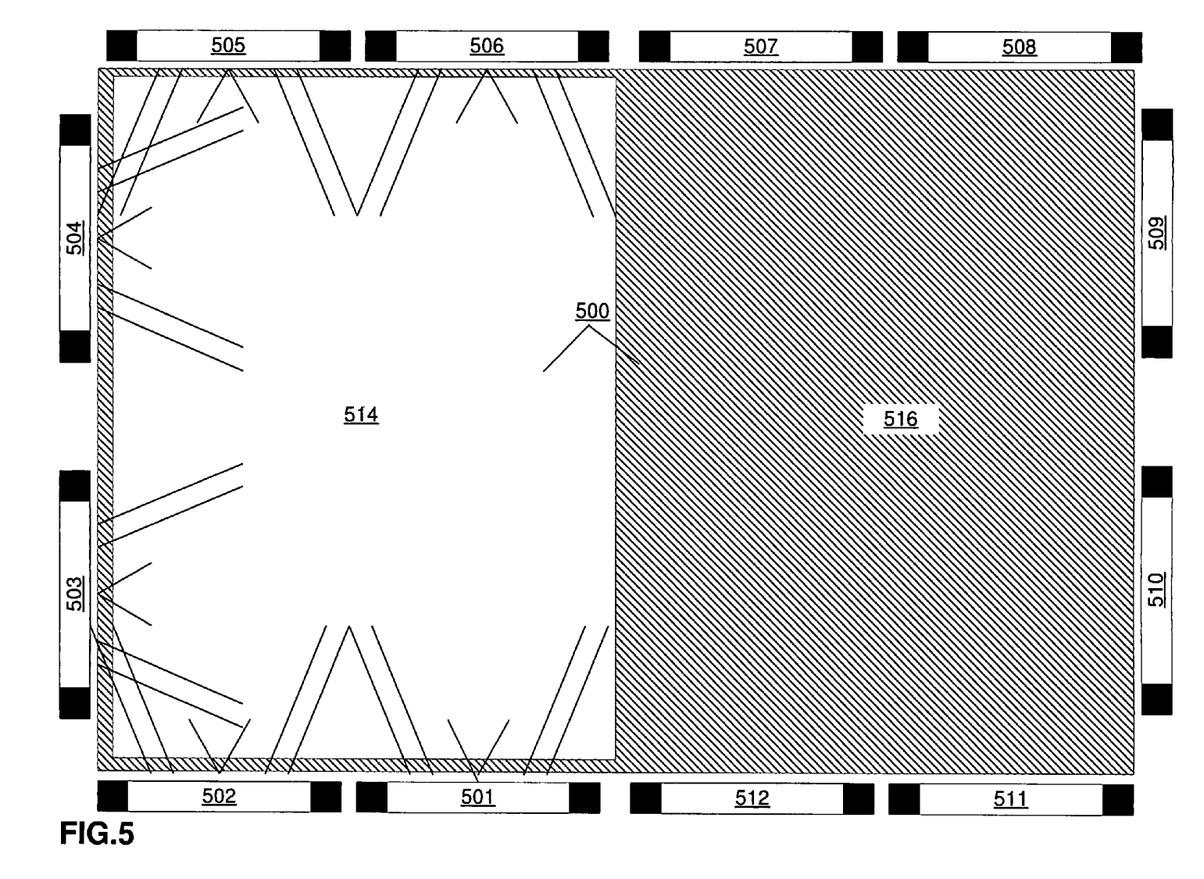
FIG. 5 is a schematic diagram illustrating reduction of power to backlight sources corresponding to portions of an exemplary display screen in accordance with an embodiment of the invention.

In some embodiments of the invention, power is conserved by managing the backlighting of the LCD display unit. As described with reference to FIG. 5, an LCD display unit 500 as used in such embodiments comprises multiple backlighting units 501-512 to illuminate the screen. By switching off a subset of the backlighting units 501-512, power may be conserved while allowing the user to be able to view at least a portion of the display 500. For example, in a similar manner to the methods and systems described with reference to FIGS. 3 and 4, when the battery level on the computing device drops below a threshold level, power is caused to be reduced or eliminated to the backlighting units 507-512, resulting in only one portion 514 of the display 500 being illuminated. Preferably, the resolution of the projected display is reduced accordingly, so only the illuminated portion 514 may be used by the user; the user is thus prevented from, for example, moving a cursor into the unilluminated portion 516 of the display 500.

Figure 6:
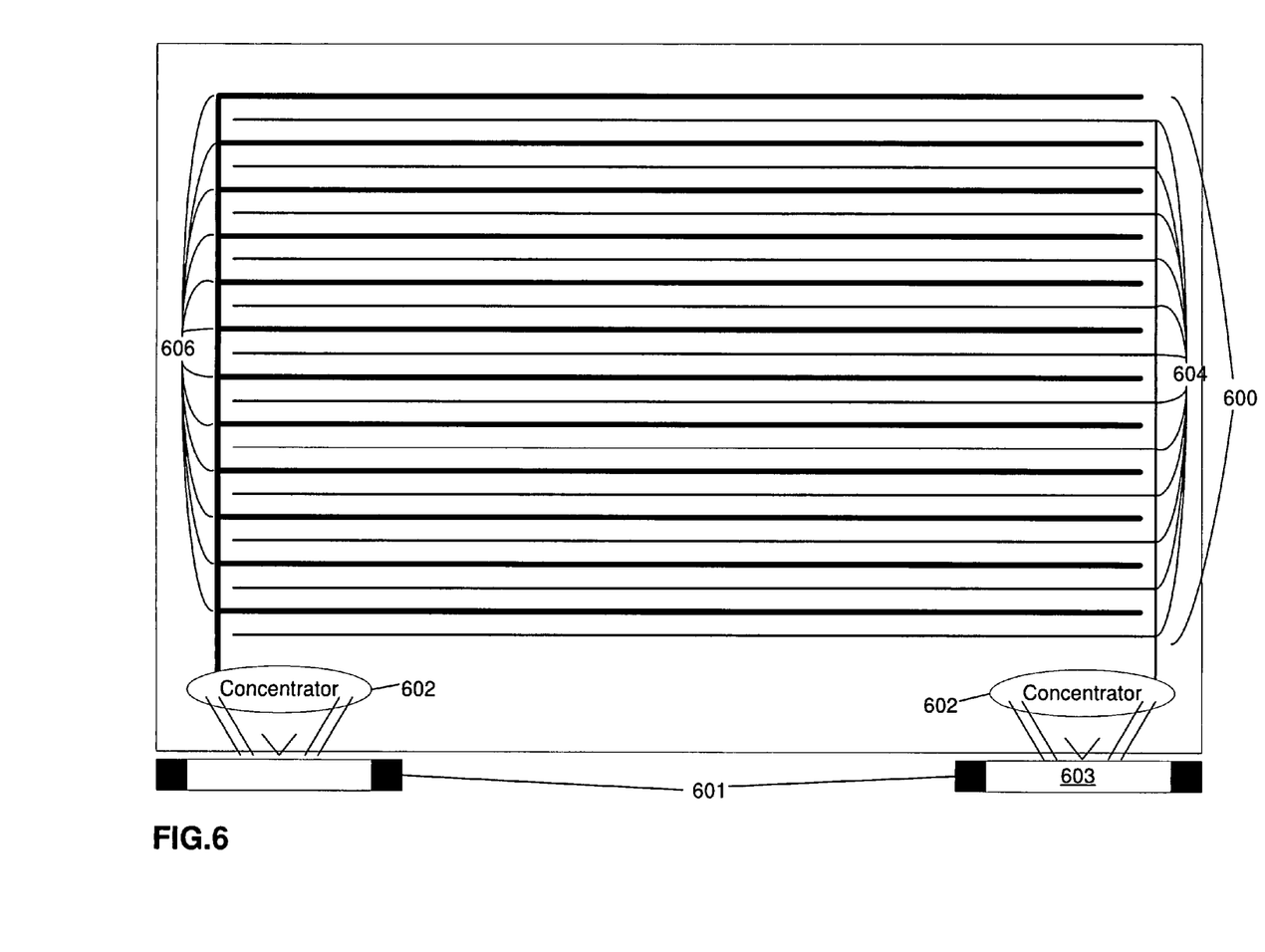
FIG. 6 is a diagram illustrating reduction of power to backlight sources corresponding to interlaced portions of exemplary display screen, in accordance with an embodiment of the invention.

In still other embodiments of the invention, the reduction in power to backlighting is combined with maintaining the same screen size but reducing the spatial resolution. The technology is preferably deployed for backlight arrangements in engraved light guides, as illustrated in FIG. 6. The lightguides 600 are engraved reflective channels that are matched to a TFT pixelmask. Light is generated by light sources 601 and concentrated by concentrators 602 where it is then channeled via the light guides 600. As illustrated in FIG. 6, when battery level drops below some threshold value, power is reduced or eliminated to a light source 603 associated with interlaced pixel rows 604, so that only the odd pixel rows 606 are illuminated, thereby preserving backlight power. In such an arrangement, software on the computing device can either reduce the resolution of the projected display (i.e., so that no image is projected onto unilluminated rows), or not (i.e., so that the full resolution image is projected onto both illuminated and unilluminated rows). In another embodiment, additional light sources are used and associated with larger intervals of rows (e.g., three light sources, each controlling every third row; four light sources, each controlling every fourth row; etc.)

Still other embodiments of the invention conserve backlight power through color reduction. Color reduction is applied in accordance with methods described above in hardware configurations wherein different light sources are used for the backlight for different colors, e.g., blue, green, red. Additionally, in an embodiment of the invention another backlight color, e.g. white, is used to present black and white (grayscale) images thus reducing the power consumption even further. It will be appreciated that variations in the arrangement of the light sources over those shown are contemplated in embodiments of the present invention. The software controls the TFT pixels to generate the resulting image for best readability.

Figure 7:
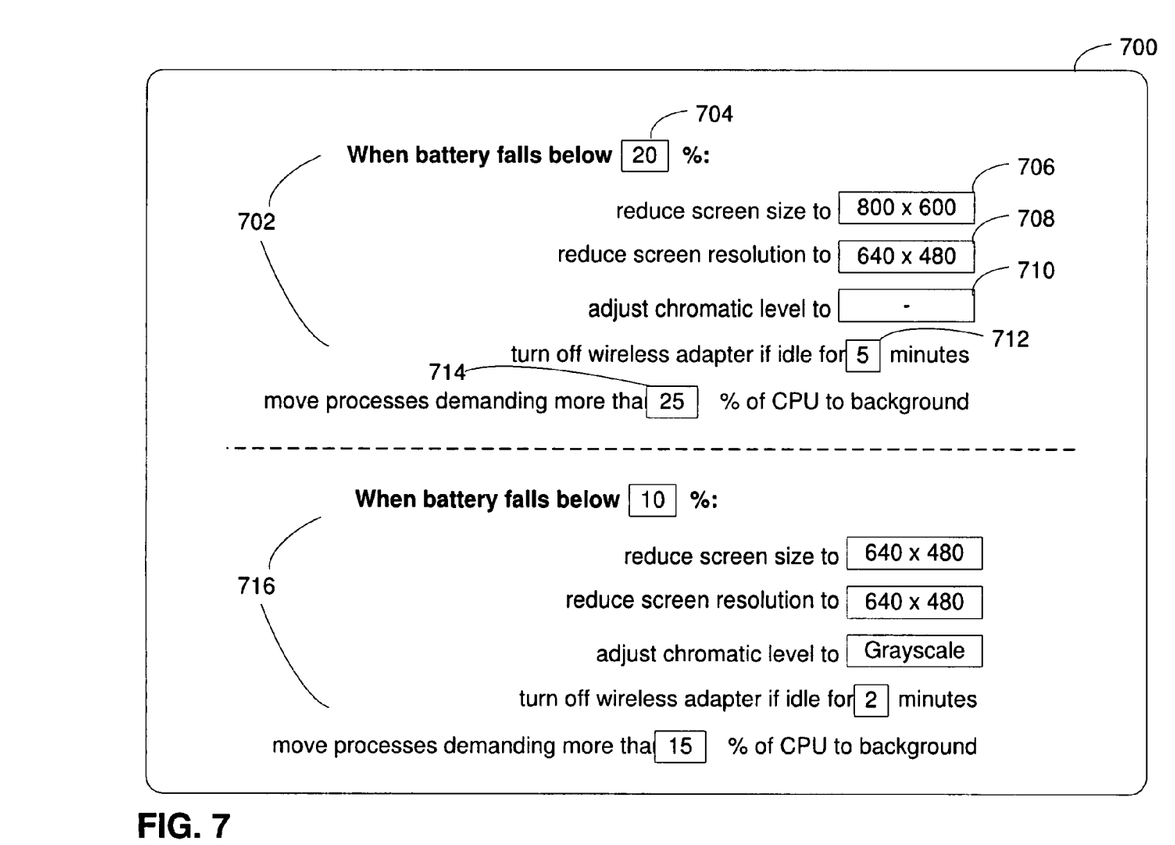
FIG. 7 is an illustration of an exemplary user interface for configuring parameters and values used in the management of power conservation, in accordance with an embodiment of the invention.

Turning attention to FIG. 7, an exemplary user interface 700 is presented through which a user can configure power management features of a portable computing device, in accordance with an embodiment of the invention. Values input into the user interface 700 are used by the operating system to manage power-consuming features of the portable computing device using methods such as those described above. In a first section 702 of the user interface 700, the user can input a first threshold value 704, such that when the battery level drops below this threshold value 704, a number of power conserving actions may be taken. The user can input a reduced size for a display at one option 706. At a second option 708, the user can input a reduced size for the display resolution. At another option 710, the user can input a modified chromatic level for the display, such as grayscale. At another option 712, the user can input a number of minutes such that power is reduced or eliminated to a wireless network adapter if no wireless networking activity has taken place for that number of minutes. At still another option 714, the user can specify a threshold for intensive processing, such that any processes consuming more than that threshold percentage of the CPU's clock cycles are moved to become less power-demanding background processes. These options are only exemplary, and many other user options may be used additionally or alternatively in embodiments of the invention.

In a second portion 716 of the user interface 700, the user can input secondary threshold values and parameters, such that if battery power falls below the secondary threshold values, additional power reducing techniques can be activated. In one embodiment of the invention, additional options are provided for allowing a more gradual application of power conserving actions as the battery progressively gets closer to depletion.

In view of the many possible embodiments to which the principles of the present invention may be applied, it should be recognized that the embodiments described herein with respect to the drawing figures are meant to be illustrative only and should not be taken as limiting the scope of the invention. For example, those of skill in the art will recognize that the illustrated embodiments can be modified in arrangement and detail without departing from the spirit of the invention. Although the invention is described in terms of software modules or components, those skilled in the art will recognize that such may be equivalently replaced by hardware components. Therefore, the invention as described herein contemplates all such embodiments as may come within the scope of the following claims and equivalents thereof.

What is claimed is:

1. A computer-readable storage medium including computer-executable instructions for conserving power on a portable computing device, the portable computing device comprising a display unit and a power unit, the power unit providing power to the display unit, the display unit providing a display at a first resolution, the computer-executable instructions comprising instructions for:
    monitoring an amount of power remaining in the power unit;
    determining that the remaining power falls below a first threshold level; and
    in response to the amount of the remaining power falling below the first threshold level:
        partitioning the display into a first portion and a second portion, wherein the first portion includes the second portion;
        causing power provided to the first portion to be substantially reduced so that a size of the display is reduced to the second portion;
    continuing to monitor the amount of power remaining in the power unit;
    determining that the remaining power falls below a second threshold; and
    in response to the amount of remaining power falling below the second threshold level:
        partitioning the display into a third portion and a fourth portion; and
        causing power provided to the third portion to be substantially reduced, wherein the second portion includes the fourth portion, and the size of the display is reduced to the fourth portion.

2. The computer-readable storage medium of claim 1 wherein the computer-executable instructions further comprise instructions:
    reducing the first resolution provided by the display unit to a second resolution, wherein the second resolution corresponds to a size of the second portion.

3. The computer-readable storage medium of claim 2 wherein the second resolution corresponds to a standardized resolution.

4. The computer-readable storage medium of claim 1, the computer-executable instructions further comprising instructions for:
    causing the second resolution provided by the display unit to be reduced to a third resolution, wherein the third resolution corresponds to a size of the fourth portion.

5. The computer-readable storage medium of claim 1 wherein the first threshold level is configured by a user of the computing device.

6. The computer-readable storage medium of claim 1 wherein the display unit is a liquid crystal display unit.

7. The computer-readable storage medium of claim 1, wherein the computer-executable instructions further comprise instructions for:
    adjusting a chromatic level of the display unit such that less power is consumed by the display unit.

8. For use in a portable computing device comprising a display unit and a power unit, the power unit providing power to the display unit and the display unit providing a display at a first resolution, a user interface for managing power consumption, the user interface comprising:
    a user-selectable option for setting a first power threshold; and
    a user-selectable option for specifying at least one action to be performed if the power remaining in the power unit falls below the first threshold;
    wherein the at least one action to be performed comprises:
        substantially reducing an amount of power directed to a first portion of the display partitioned into the first portion and a second portion, wherein the first portion includes the second portion, so that a size of the display is reduced to the second portion;

causing the display unit to provide a display at a lower resolution, wherein the first resolution is reduced to the lower resolution in accordance with a reduction in the size of the display;

a user-selectable option for setting a second power threshold, the second power threshold less than the first power threshold; and a user-selectable option for specifying at least one action to be performed if the power remaining in the power unit falls below the second threshold;

wherein the at least one action to be performed comprises:
substantially reducing an amount of power directed to a third portion of the display partitioned into the third portion and a fourth portion so that the size of the display is reduced to the fourth portion; and
causing the display unit to provide a display at a further lower resolution.

9. A method for conserving power on a portable computing device, the portable computing device comprising a display unit and a power unit, the power input providing power to the display unit and the display unit providing a display at a first resolution, the method comprising steps of:

monitoring an amount of power remaining in the power unit; and in response to the amount of remaining power falling below a first threshold level:
partitioning the entire display into a first portion and a second portion, wherein the first portion includes the second portion;
causing power provided to the first portion to be substantially reduced so that a size of the display is reduced to the second portion;
continuing to monitor the amount of power remaining in the power unit; and in response to the amount of remaining power falling below a second threshold level:
partitioning the entire display into a third portion and a fourth portion; and
causing power provided to the third portion to be substantially reduced so that the size of the display is reduced to the fourth portion;
wherein the third portion includes the second portion, and the first portion includes the fourth portion.

10. The method of claim 9 further comprising:
causing the first resolution provided by the display unit to reduce to a second resolution, wherein the second resolution corresponds to a size of the second portion.

11. The method of claim 10 wherein the second resolution corresponds to a standardized resolution.

12. The method of claim 9 further comprising the step of:
causing the second resolution provided by the display unit to reduce the display to a third resolution, wherein the third resolution corresponds to a size of the fourth portion.

13. The method of claim 9 wherein the first threshold level is configured by a user of the computing device.

* * * * *